J. KAHN.
STEAM HOSE.
APPLICATION FILED JUNE 14, 1919.
1,314,333.
Patented Aug. 26, 1919.
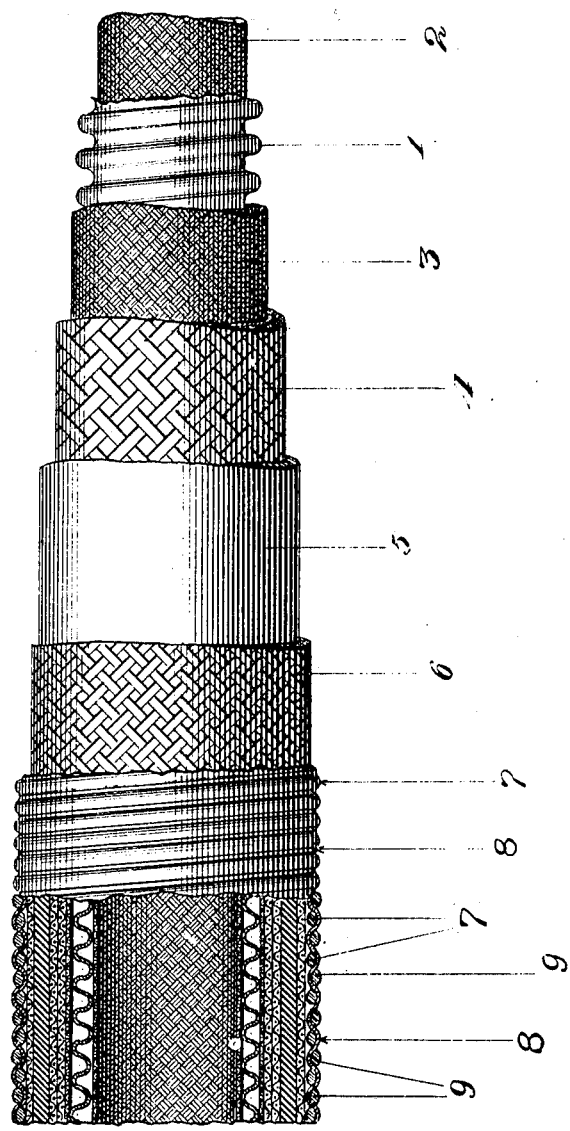

UNITED STATES PATENT OFFICE.

JULIUS KAHN, OF NEW YORK, N. Y., ASSIGNOR TO UNITED METAL HOSE COMPANY, INC., OF NEW YORK, N. Y., A CORPORATION OF NEW YORK.

STEAM-HOSE.

1,314,333.

Specification of Letters Patent.

Patented Aug. 26, 1919.

Application filed June 14, 1919. Serial No. 304,306.

*To all whom it may concern:*

Be it known that I, JULIUS KAHN, a citizen of the United States, residing in the borough of Manhattan, city, county, and State of New York, have invented certain new and useful Improvements in Steam-Hose, of which the following is a specification.

This invention relates to the construction of that class of flexible tubing or hose which is heavily reinforced and armored, so as to be able to withstand high pressures and temperatures, and which is commonly referred to as "steam hose" because it finds an important field of utility in the formation of flexible sections or connections for steam pipes. The present invention relates to an improved construction of such hose, whereby the strength of the hose to withstand either external or internal pressure is increased, whereby effective thermal insulation is provided so as to prevent condensation of steam within the hose, and whereby the hose is armored so as to be able to resist the effects of rough handling to the maximum degree. The accompanying drawing shows a preferred embodiment of the invention which I have chosen to illustrate the principle thereof and the best mode now known to me for performing the same. The figure shows a section of the hose partly in elevation and partly in section, and also illustrates the successive layers of which the hose is built up, broken away so that a portion of each layer is illustrated in elevation.

The basic element of the hose or that part which is relied upon primarily to make the hose steam or fluid tight, is a flexible metal tube, indicated at 1 in the drawing. While this flexible metal tube may be of any suitable construction, I prefer to use a seamless corrugated flexible tube of the character disclosed in patent to Brinkman, No. 1,120,268. A tubing of this character possesses the necessary degree of flexibility, is absolutely tight by reason of its seamless character, and when incorporated with other elements of the hose, as will be described, is capable of withstanding very high internal pressures. This ability to withstand high internal pressure is secured by combining the corrugated tube with one or more tubular elements adapted to prevent the corrugated tube from elongating. These elements preferably take the form of tubes of braided wire and may be located either inside or outside of the corrugated tube. Preferably, however, braided wire tubes are located both inside and outside, as shown at 2 and 3 in the drawing. This combination I find especially effective. By using a braided tube inside of the corrugated tube I am enabled to make the corrugated tube withstand extremely high pressures, such as it has never been possible before to carry in a flexible tube.

Where the hose is to be used to carry steam or other hot fluids I place over the wire braiding 3 a thick layer of asbestos or equivalent heat-insulating material 4. Preferably this is applied in the form of one or more plies of braided asbestos yarn with rubber cement to hold it in place, but asbestos yarn wound around the tube or asbestos cloth may be utilized, if preferred. Over the asbestos I place a thick layer of rubber 5, which acts as a cushioning element, protecting the asbestos layer from the effects of bending or external blows which might tend to disintegrate the same, and also protecting it from absorbing moisture from the outside, which would tend to impair its heat-insulating qualities. The rubber layer also gives body to the hose, and while not interfering with its flexibility, nevertheless tends to prevent the hose from becoming bent too sharply or kinking in such a way as to injure it. The asbestos layer being between the metal part of the hose and the rubber, also protects the rubber from the effects of excessive heat, which would deteriorate it. Over the rubber I preferably place one or more plies of frictioned cotton duck 6, or other fabric, which protects the rubber and forms a base for the application of the armor. The latter, which constitutes the actual wear-resisting surface of the hose and which also greatly assists the hose in withstanding external pressure so as to prevent the hose from being crushed or flattened out, is preferably constructed as shown in the drawing. As here illustrated, a heavy wire 7, preferably of steel and of somewhat flattened cross section, is wound over the coating of cotton duct with spaces between the convolutions of the winding just a little greater than the diameter of the wire in a longitudinal direction. A layer of rubber 8, thinner than the inner layer of rubber 5 is then placed over the wire 7, and another similar wire 9 is then wound over the layer of rubber, the convolutions of the winding 9 alternating with the convolutions of the winding 7, so that it forces itself down between the convolutions of the first applied wire, the rubber layer being pressed in between the convolutions. In this way the two wires of the armor form a practically continuous metal layer protecting the hose from crushing, and the two wires furthermore lock themselves firmly against displacement so that they cannot become loose or be pushed out of place if the hose is dragged around or otherwise roughly handled.
While I have illustrated and described in detail one preferred embodiment of my invention, it will be understood that departures may be made therefrom in some cases to meet particular conditions, and that a hose embodying some of the features of construction set forth, but not others, may be of utility under some conditions of use.

I do not, therefore, intend to limit myself to the specific construction set forth any further than as specified in the claims.

Having thus described my invention, I claim:—

1. A flexible pipe for resisting high internal pressures, comprising a seamless corrugated metal tube having inner and outer tubes of braided metal fabric associated therewith.

2. A flexible pipe for resisting high internal pressures, comprising a seamless corrugated metal tube having an inner tension resisting element associated therewith in the form of a braided wire tube.

3. A hose of the character described comprising a tight flexible metallic tube having a metallic tension-resisting tube associated therewith, and provided with a covering comprising a thick heat-insulating layer over which is placed a cushioning and moisture-resisting layer which in turn is covered by a wear-resisting armor.

4. A hose of the character described comprising a flexible corrugated metal tube, a braided wire tube thereover, a thick layer of asbestos over the braided wire tube, a thick layer of rubber over the asbestos, a layer of fabric over the rubber and an armor over the fabric.

5. A hose of the character described comprising a flexible corrugated metal tube, a braided wire tube thereover, a thick layer of asbestos over the braided wire tube, a thick layer of rubber over the asbestos, a layer of fabric over the rubber and an armor over the fabric, said armor comprising two helical windings of heavy wire having a layer of flexible material between them, the convolutions of the outer winding fitting between the convolutions of the inner winding.

6. A steam hose comprising the layers 1, 2, 3, 4, 5, 6, 7, 8 and 9, substantially as described.

7. A flexible hose having an armor comprising an inner helical winding of a strand of substantial cross section over which is placed a thin layer of flexible material, and an outer helical winding of a strand of substantial cross section wound over such layer of flexible material, the convolutions alternating with the convolutions of the inner helix, and being forced down into the spaces between the convolutions of the inner helix, the convolutions of the two helices being spaced apart a distance but slightly greater than the diameter of the windings so that a substantially continuous reinforcement is provided.

8. A hose of the character described comprising a tight flexible metallic tube provided with a covering comprising a thick heat-insulating layer over which is placed a thick cushioning and moisture-resisting layer of rubber, the exterior of the hose being protected with an armor.

JULIUS KAHN.